US010099508B2

(12) United States Patent
Labuschagne

(10) Patent No.: US 10,099,508 B2
(45) Date of Patent: Oct. 16, 2018

(54) AIRLESS TYRE FOR VEHICLES

(75) Inventor: Pieter Johannes Labuschagne, Klerksdorp (ZA)

(73) Assignee: Prospect SA Investments 121 Limited, Kierksdorp (ZA)

( * ) Notice: Subject to any disclaimer, the term of this patent is extended or adjusted under 35 U.S.C. 154(b) by 679 days.

(21) Appl. No.: 14/403,514

(22) PCT Filed: May 24, 2012

(86) PCT No.: PCT/IB2012/052599
§ 371 (c)(1),
(2), (4) Date: Jan. 29, 2015

(87) PCT Pub. No.: WO2012/160534
PCT Pub. Date: Nov. 29, 2012

(65) Prior Publication Data
US 2015/0136285 A1 May 21, 2015

(51) Int. Cl.
B60B 9/00 (2006.01)
B60C 7/10 (2006.01)
B60C 7/22 (2006.01)
B60C 7/14 (2006.01)

(52) U.S. Cl.
CPC .................. B60B 9/00 (2013.01); B60C 7/10 (2013.01); B60C 7/22 (2013.01); B60C 2007/107 (2013.01); B60C 2007/146 (2013.01)

(58) Field of Classification Search
CPC .... B60B 9/00; B60C 7/10; B60C 7/22; B60C 2007/146
USPC .......................... 152/5, 7, 246, 316, 318–328
See application file for complete search history.

(56) References Cited

U.S. PATENT DOCUMENTS

| 1,503,667 | A | * | 8/1924 | Roberts | B29D 23/24 |
| | | | | | 152/429 |
| 4,095,846 | A | | 6/1978 | Agins | |
| 4,784,201 | A | * | 11/1988 | Palinkas | B60B 9/12 |
| | | | | | 152/12 |
| 6,286,572 | B1 | | 9/2001 | Chen | |
| 7,174,936 | B2 | * | 2/2007 | Becker | B60C 7/12 |
| | | | | | 152/246 |
| 9,108,470 | B2 | * | 8/2015 | Tercha | B60C 7/08 |

(Continued)

FOREIGN PATENT DOCUMENTS

| CA | 2525982 A1 | 4/2007 |
| CN | 1161021 A | 2/1996 |

(Continued)

OTHER PUBLICATIONS

International Search Report of PCT/IB2012/052599 dated Oct. 29, 2012.

Primary Examiner — Samuel J Morano, IV
Assistant Examiner — Jean W Charleston
(74) Attorney, Agent, or Firm — Amster, Rothstein & Ebenstein LLP

(57) ABSTRACT

A non-inflatable vehicle tire comprising a rubber carcass molded to fit and be secured to a wheel rim with a series of equally spaced passages extending transversely through the carcass to provide resilient supporting ribs between the passages and having a road engaging tread molded to the carcass over a band of flexible steel cord reinforcing in which the band comprises a plurality of superimposed plies of coated hard steel cord and in which minor passages are provided through the ribs.

10 Claims, 3 Drawing Sheets

(56) References Cited

U.S. PATENT DOCUMENTS

| | | | |
|---|---|---|---|
| 2004/0012246 A1* | 1/2004 | Rhyne | B60B 1/0223 |
| | | | 301/55 |
| 2004/0118498 A1* | 6/2004 | Noferi | D07B 1/0646 |
| | | | 152/451 |
| 2009/0211674 A1 | 8/2009 | Hanada et al. | |
| 2011/0011506 A1 | 1/2011 | Manesh et al. | |
| 2011/0079335 A1 | 4/2011 | Manesh et al. | |

FOREIGN PATENT DOCUMENTS

| | | | | |
|---|---|---|---|---|
| CN | 101314315 | A | 12/2008 | |
| CN | 202046165 | U | 11/2011 | |
| EP | 0176139 | A1 | 4/1986 | |
| EP | 2177375 | A1 | 4/2010 | |
| GB | 2297298 | A | 7/1996 | |
| JP | 05-508822 | A | 1/1992 | |
| JP | 06-127206 | A | 5/1994 | |
| JP | 05-077605 | A | 9/1994 | |
| JP | 10-236217 | A | 9/1998 | |
| JP | 2005-500932 | A | 3/2003 | |
| JP | 3952211 | B1 | 8/2007 | |
| JP | 2008-044445 | A | 2/2008 | |
| JP | 2009-269413 | A | 11/2009 | |
| JP | 2012-035815 | A | 2/2012 | |
| JP | 2012-006560 | A | 12/2012 | |
| WO | WO-9605917 | A1 * | 2/1996 | B60C 7/102 |

\* cited by examiner

AIRLESS TYRE FOR VEHICLES

FIELD OF THE INVENTION

This invention relates to tyres for use on a range of vehicles from light vehicles through a large range of vehicles used for both on and off road applications, both motorized and unmotorized, and which are non-inflatable.

BACKGROUND TO THE INVENTION

Most tyres for vehicles of this general nature are expensive and subjected to severe wear. Presently these tyres are pneumatically inflated which adds to the cost of manufacture as well as making them subject to damage.

Many efforts extending over many years have been made to achieve a commercially acceptable tyre of this nature. To date, in spite of large resources available to tyre manufacturers, no satisfactory tyre has been produced.

Tyres presently made and used when worn beyond repair are a serious waste disposal hazard.

OBJECT OF THE INVENTION

It is the object of this invention to provide a non-inflatable vehicle tyre which will satisfactorily perform the duty required of such tyres and will provide long useful life.

SUMMARY OF THE INVENTION

According to this invention there is provided a non-inflatable vehicle tyre comprising a rubber carcass moulded to fit and be secured to a wheel rim with a series of equally spaced passages extending transversely through the carcass to provide resilient supporting ribs between the passages and having a road engaging tread moulded to the carcass over a band of flexible reinforcing.

Further features of this invention provide for the tyre to be made by moulding an assembly of a raw rubber carcass and a reinforcing layer and rubber tread onto a wheel rim and applying a band of reinforcing beneath a body of rubber tread material to complete a solid tyre, and curing the rubber under heat and pressure to bond the carcass and reinforcing to the tread.

The invention also provides for the reinforcing to be a steel cord band in a composite plurality of plies, and for the cross-section of the passages to form waisted ribs optionally with minor passages through at least some of the unwaisted parts of the ribs.

Further features of the invention provide for the passages through the tyre to be inclined to the axis thereof; and for at least the openings into the passages to be shaped to induce air flow therethrough.

The invention also provides for the steel cord reinforcing to comprise hard steel coated components galvanized or coated with brass and to be of about 2 mm in diameter.

Further features of the invention provide for the band of steel cord to comprise a pair of outer plies with the cord components parallel to the sides of the carcass and a pair of inner plies having their cord components inclined across the carcass in opposite directions; and for the inclination of the cord components to be about 30°.

A yet further feature of this invention provide for radial holes to be provided in the carcass extending outwardly from the passages through the tread.

The invention also provides for the inner circumference of the carcass to be moulded to extend between flanges on the wheel rim forming a shallow channel around the rim and around a series of outwardly projecting flanged ribs along the outer surface.

The term "rubber" used in this specification is to be understood to include natural rubber and synthetic rubber, mixtures of these and other polymer material having similar physical properties.

BRIEF DESCRIPTION OF THE DRAWINGS

These and other features of this invention will become apparent from the following description set forth below with reference to the accompanying drawings in which.

DETAILED DESCRIPTION OF THE INVENTION

Figure 1:
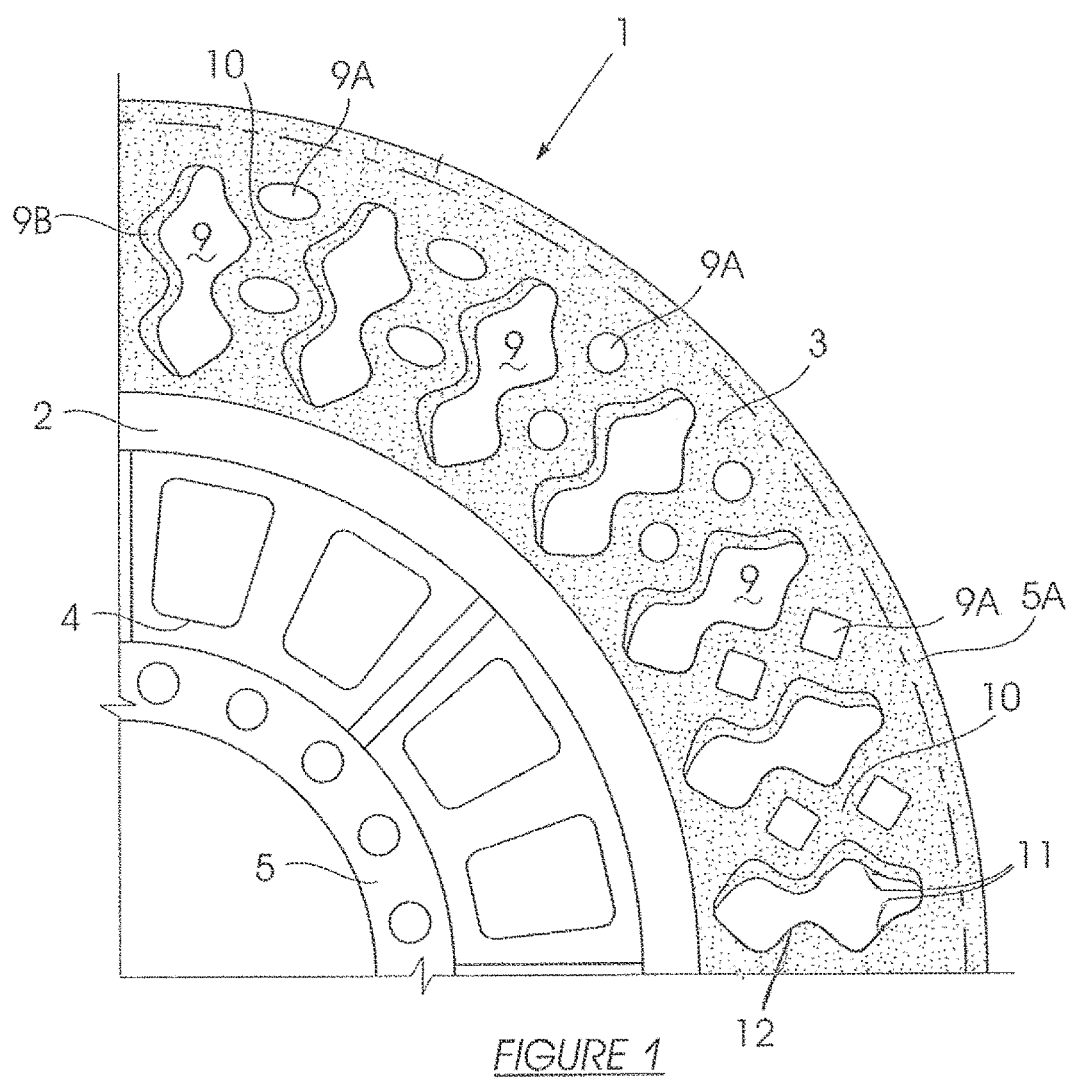
FIG. 1 shows a section of a tyre and wheel rim.
Figure 2:
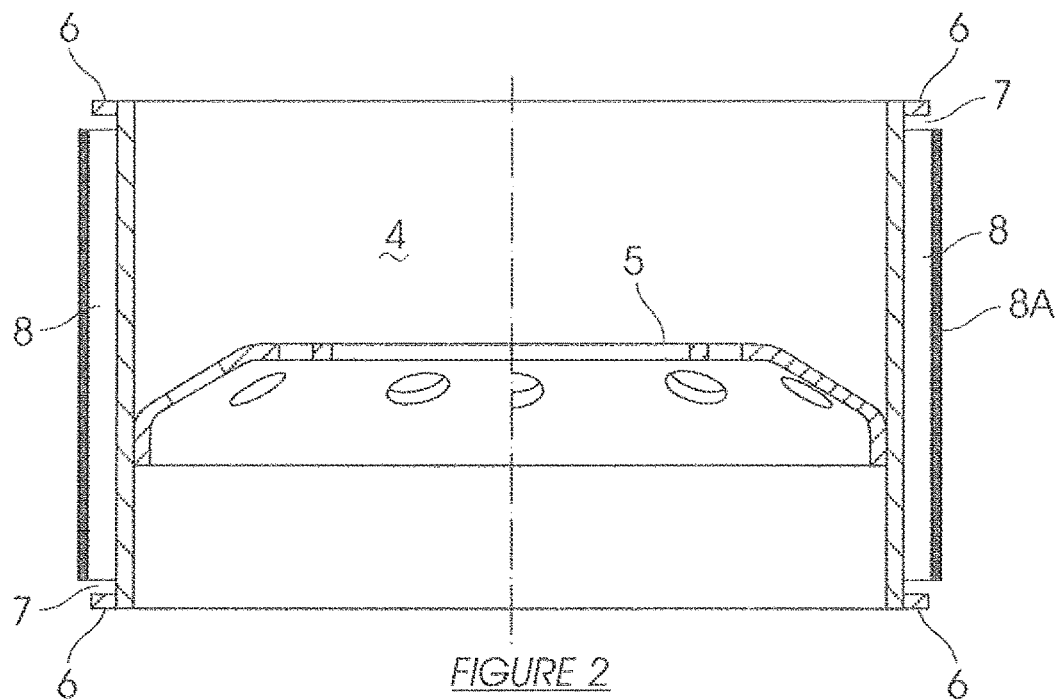
FIGS. 2 & 3 show a wheel rim suitable for the tyre in cross-sectional and elevation views.
Figure 3:
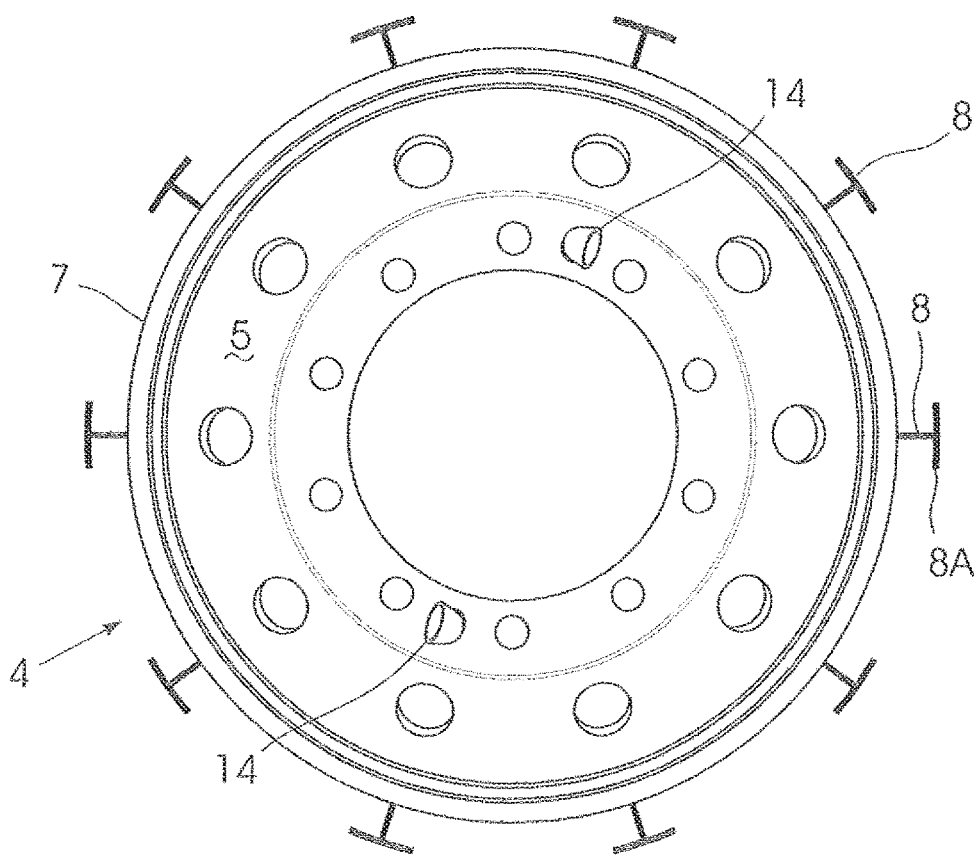
Figure 4:
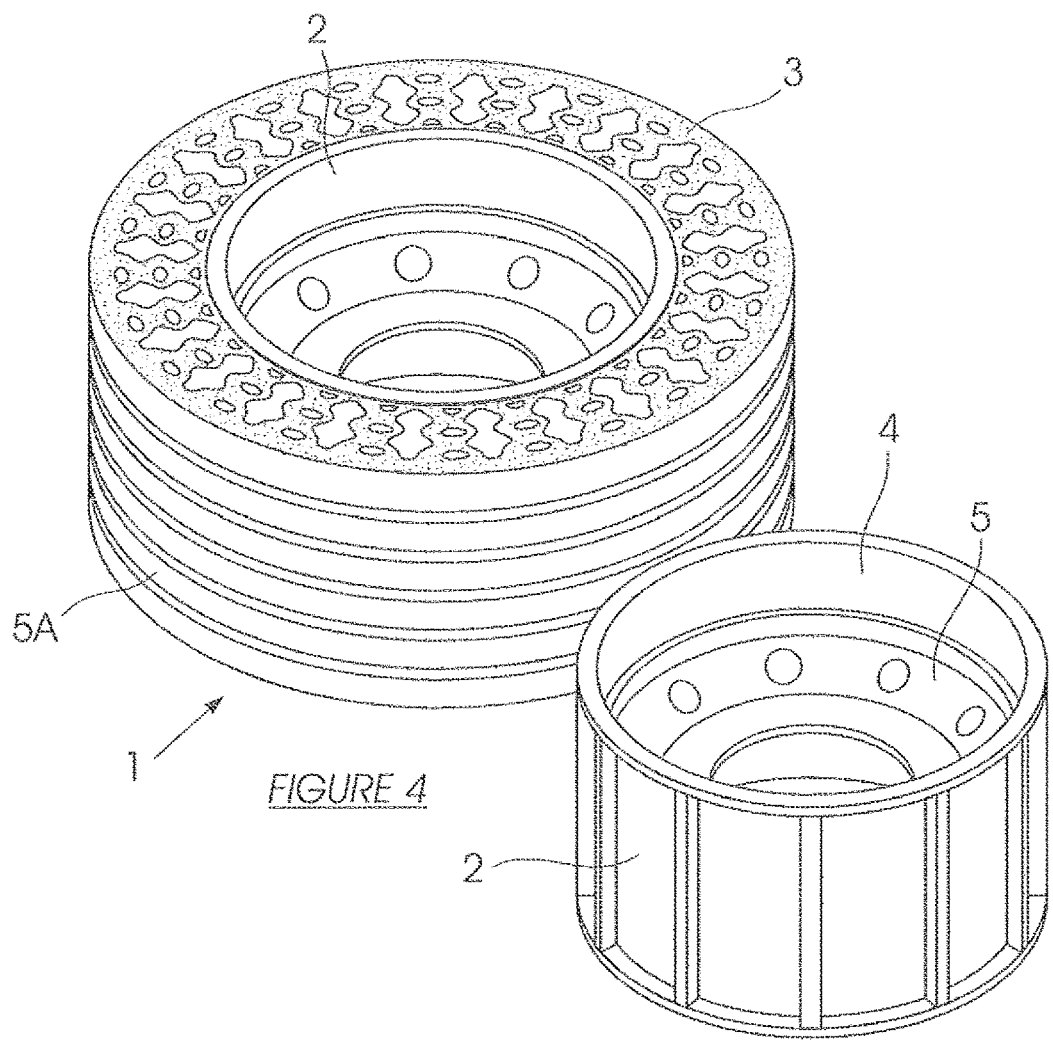
FIG. 4 shows a tyre and different wheel rim in perspective.

As illustrated in FIG. 1 a section of a non-inflatable tyre (1) is fitted to a wheel rim (2). The wheel rim (2) provides a peripheral seat for the carcass and tread assembly and includes a disc (5) for mounting the tyre to a vehicle wheel hub. The wheel rim (2) includes an integral wheel drum (4) shown in FIG. 2. The rim (2) has outwardly directed lips (6) forming a shallow channel (7) shown in FIG. 2. Transverse T-sectioned ribs (8) shown in FIG. 3 extend at spaced intervals across the outer surface of the drum (4) to anchor the carcass (3) to the rim (2) and drum (4). These ribs (8) also have flanges (SA) to assist in anchoring the moulded rubber to the rim (2).

The carcass (3) of the tyre (1) can be moulded by either injection or pressure moulding from the polymer selected to meet the particular purpose which the tyre is to meet. Essentially the polymers will comprise a mixture of natural rubber blended with a polybutadiene compound and tyre manufacturing experts will be able to select the desired mixture.

A basic vehicle tyre carcass can comprise a mixture to provide:

Tensile strength MpA—20
Hardness IRHD—65
30 Elongation at break %—650
Rebound resilience %—70

The compound values for the tread will be respectively 21, 68, 600 and 55 and have an abrasion loss per mm3 of 85. These figures will of course vary for both environment and purpose of the tyre and experts in the field will determine final constituents with application of their knowledge to necessary experimentation.

The moulding operation will result in a carcass (3) being secured to a wheel rim (2) with a body of resilient material with radially projecting ribs (10) forming waisted passages (9) between them and connecting the wheel drum to an outer band which will support the tread (5A) for the tyre. The rigidity of the ribs (10) can be varied by the choice of the minor passages (9A) provided through the solid material of the moulded carcass (3).

In the illustrative wheel assembly the passages (9) are shaped to result in the radially extending supporting ribs (10) being waisted at (11) and (12). The unwaisted parts of the ribs (10) have the minor passages (9A) therethrough. The shape, location and number of the further passages (9A) may be varied to give the desired resilience properties or may be used for identification of a tyre as suitable for a particular purpose. These passages are shown, for example, as being of circular, elliptical or diamond shape in FIG. 1. Openings may also be provided from the passages (9) radially through the usual recesses in the tyre tread (5A).

Figure 5:
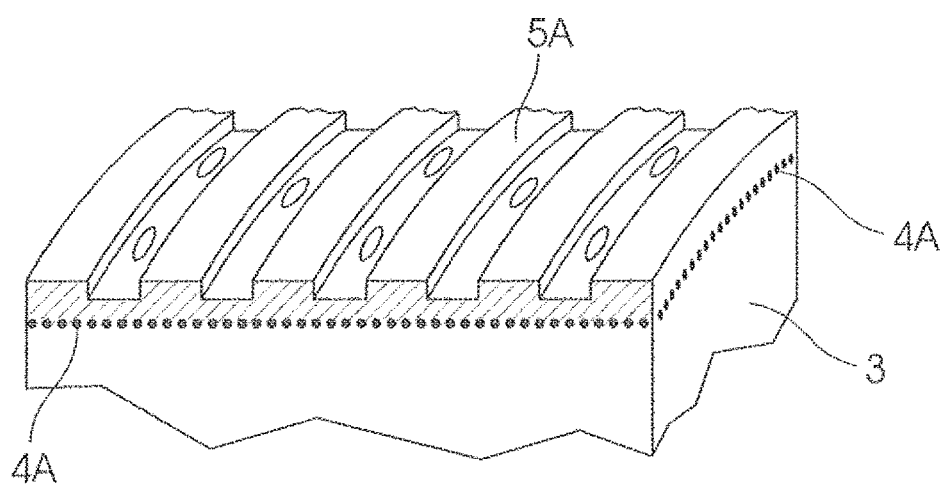
FIG. 5 shows details of the tyre.

The tread portion (5A) is vulcanized to the carcass (3) over an endless band of flexible steel cord plies (4A) shown in FIG. 5. These plies (4A) are known in tyre manufacture and made from usually entwined hard steel galvanized or brass coated components to form the cord material so that it will be bonded between the tread (5A) and carcass (3) through the apertures in the plies. This will contain any tendency of the tyre (1) to change shape under load and increase the securing of the tread to the carcass without adversely affecting the hjresilience of the complete wheel assembly. The plies will be laid so that the ends of each ply has a core end line extending at an angle across the carcass and spaced from that of the other plies. The core components of the outer two plies will be parallel to the axis of the tyre while the inner two plies will have component lines inclined in opposite directions at angles of about 30° to the tyre axis.

It is a particular feature of the tyre assembly that it includes characteristics to induce airflow across the width of the carcass and rim to prevent any overheating of the tyre and brake assemblies during use. This can be effected by rounding one radial edge of the operatively outside edge of passages (9).

In FIG. 1, for example, there is also indicated that one side of the tyre has the entrance to the passages (9) shaped as indicated at (9B) to induce airflow through the tyre from the operatively outside of the tyre to the inside. The opposite edge can be provided with a scooped edge to further accentuate the cooling effect.

The tyres are designed to be fitted to a vehicle in one position only so that the feature of cooling can be achieved.

The passages (9) are preferably inclined from the operatively outside rearwardly to the inside. This also induces flow through the passages as the wheel rotates and moves forward.

Also there is in the assembly the same cooling effect applied to the drum by directing airflow through the moving wheel onto the braking assembly. This is indicated as scoops (14) in FIG. 3.

FIG. 5 shows diagrammatically a cross section of part of tyre indicating the flexible steel cord (4A) between the carcass (3) and the tread (5A) of the tyre.

The embodiment of the invention described above may be modified by those skilled in the art in many ways to give different particular configurations of component details without departing from the scope of the invention. For example, the band of reinforcing described above may be provided by carbon fibre, nylon, woven fabric or the like. Further modifications will be made to suit the different requirements of the wide range of vehicles for which this tyre may be adapted. This is achieved without the problems encountered in the use of inflation.

The invention claimed is:

1. A non-inflatable vehicle tyre comprising a rubber carcass moulded to fit and be secured to a wheel rim with a series of equally spaced passages extending transversely through the carcass to provide resilient supporting ribs between the passages and having a road engaging tread moulded to the carcass over a band of flexible reinforcing, wherein the cross section of the passage form radially extending waisted ribs having an unwaisted part, within the rubber carcass, and in which the passages are inclined rearwardly relative to an axis of the tyre from an operatively outside portion of the tyre to an inside portion of the tyre, or in which at least openings into the passages are shaped to induce airflow therethrough by a radial edge of the operatively outside edge of the passage being rounded relative to a sidewall of the tyre or by an opposite radial edge of the operatively outside edge of the passage being scooped relative to the sidewall of the tyre.

2. A vehicle tyre as claimed in claim 1 made by moulding an assembly of the raw rubber carcass and rubber tread onto a wheel rim and applying the band of flexible reinforcing beneath the body of rubber tread material to complete a solid tyre, and curing the rubber under heat and pressure to bond the carcass and reinforcing to the tread.

3. A vehicle tyre as claimed in claim 1 in which the reinforcing is a steel cord band in a composite plurality of plies.

4. A vehicle tyre as claimed in claim 3 in which the steel cord reinforcing comprises hard steel coated components galvanized or coated with brass.

5. A vehicle tyre as claimed in claim 4 in which the steel cord component is of about 2 mm diameter.

6. A vehicle tyre as claimed in claim 4 in which the band of steel cord comprises a pair of outer plies with the cord components parallel to the sides of the carcass and a pair of inner plies having their cord components inclined across the carcass in opposite directions.

7. A vehicle tyre as claimed in claim 6 in which the inclination of the cord components is about 30°.

8. A vehicle tyre as claimed in claim 1 in which minor passages are provided through at least some of the unwaisted parts of the ribs.

9. A vehicle tyre as claimed in claim 1 in which radial holes are provided in the carcass extending outwardly from the passages through the tread.

10. A vehicle tyre as claimed in claim 1 in which the inner circumference of the carcass is moulded to extend between flanges on the wheel rim forming a shallow channel around the rim and around a series of outwardly projecting flanged ribs along the outer surface.

* * * * *